Jan. 16, 1951  R. W. KEELER  2,538,102
LOADER MECHANISM FOR TRACTORS
Filed Feb. 25, 1947  4 Sheets-Sheet 1
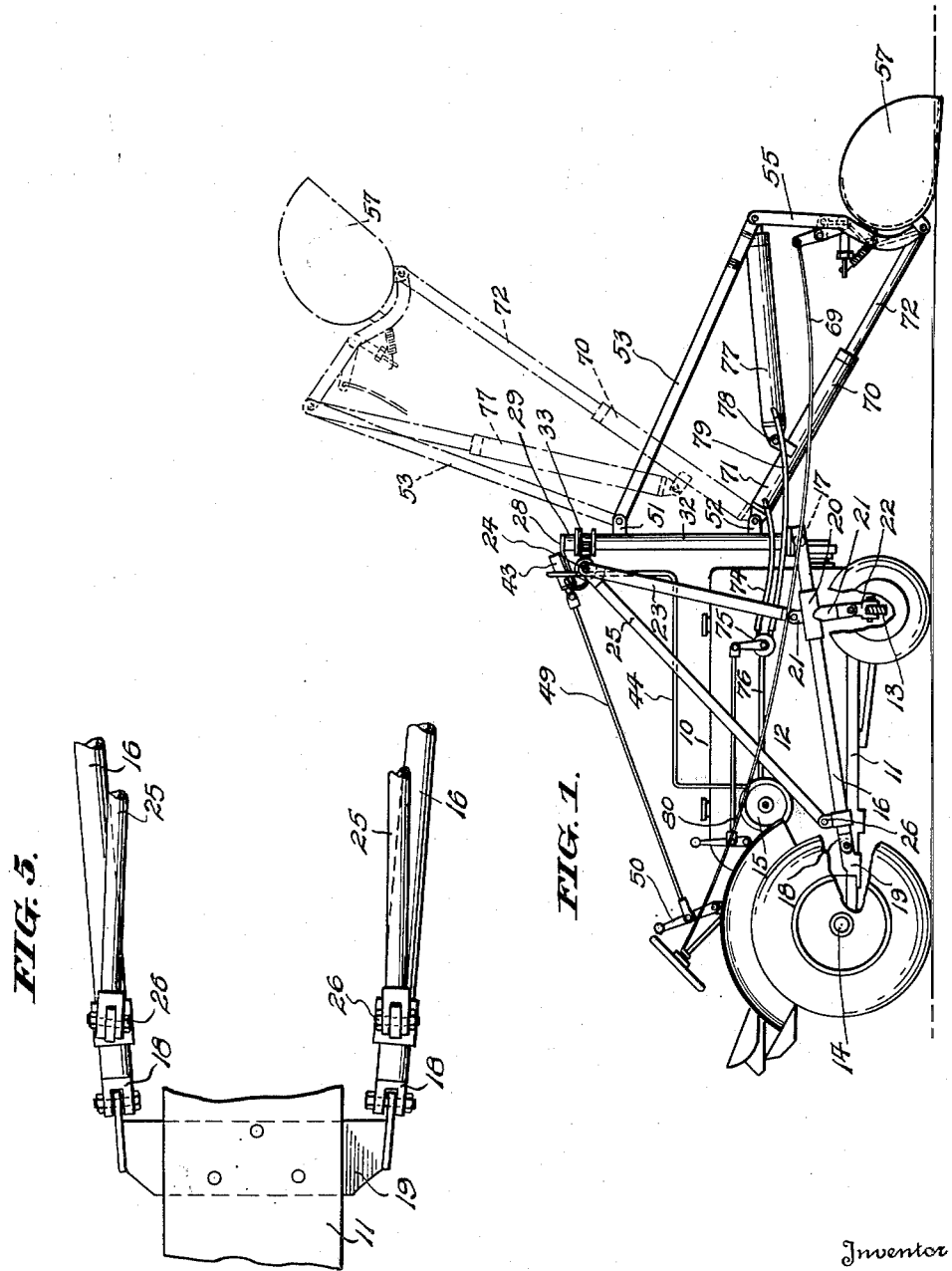
Inventor
Raymond W. Keeler.
By W. S. McDowell
Attorney

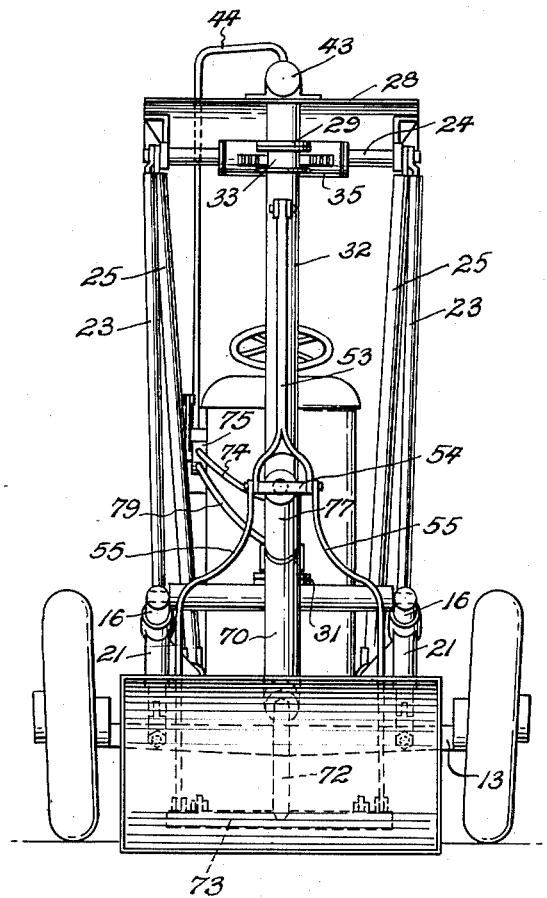

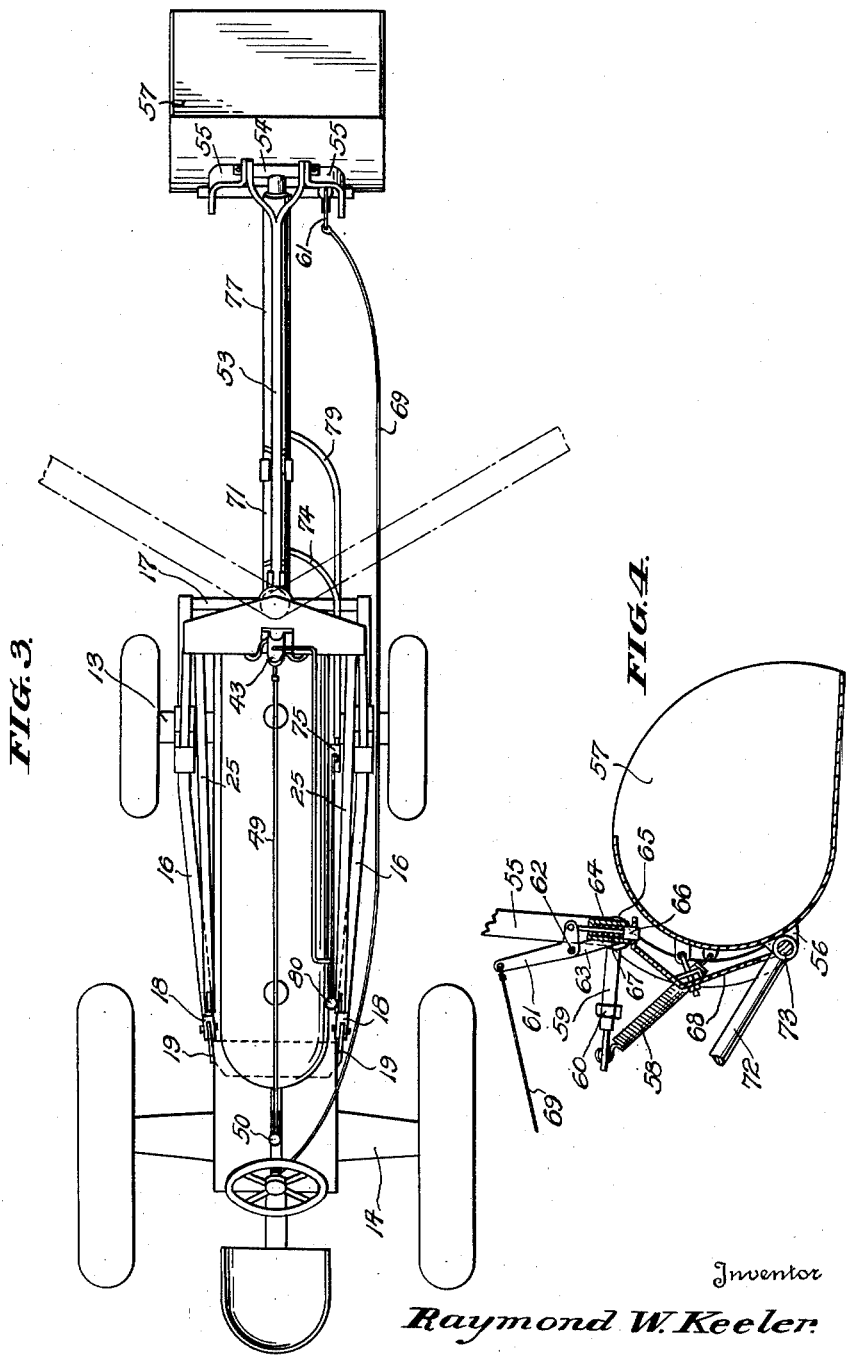

Jan. 16, 1951 R. W. KEELER 2,538,102
LOADER MECHANISM FOR TRACTORS
Filed Feb. 25, 1947 4 Sheets-Sheet 4
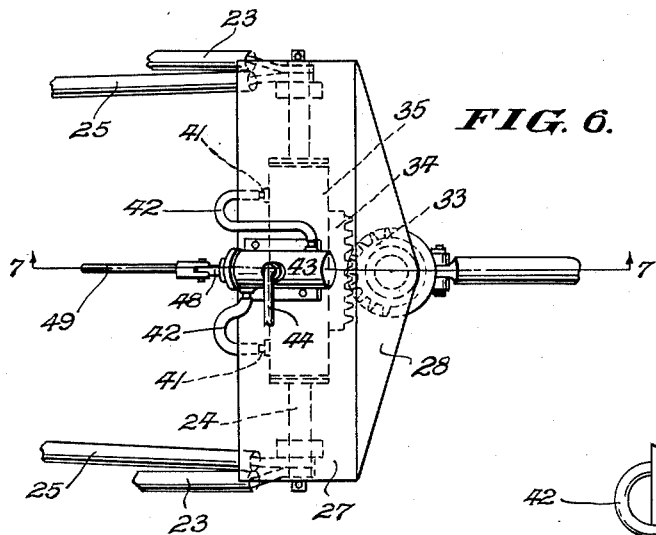
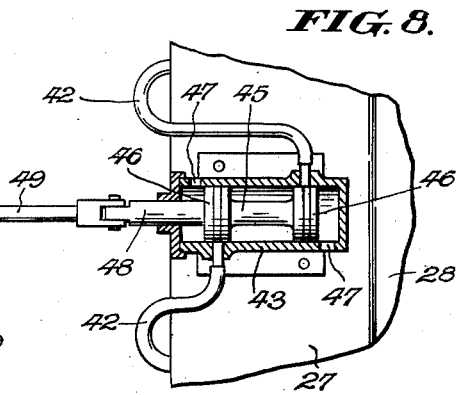
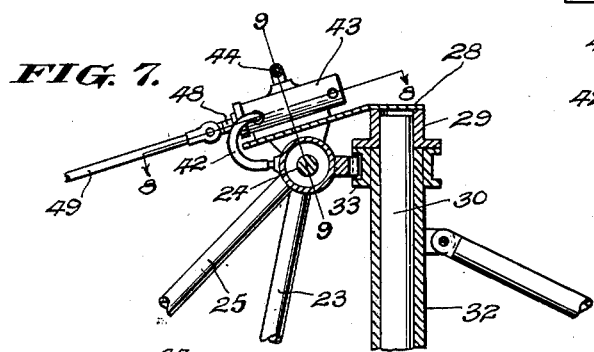
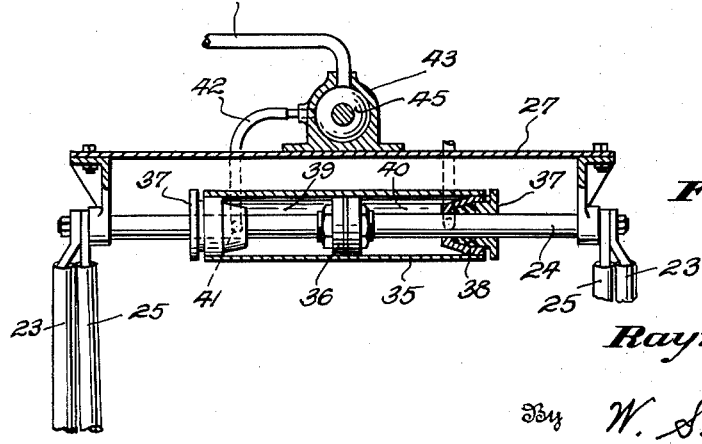
Inventor
Raymond W. Keeler
By W. S. McDowell
Attorney Patented Jan. 16, 1951

2,538,102

UNITED STATES PATENT OFFICE 2,538,102

LOADER MECHANISM FOR TRACTORS

Raymond W. Keeler, Galion, Ohio, assignor to Carter Machine Company, Inc., Galion, Ohio, a corporation of Ohio Application February 25, 1947, Serial No. 730,689

8 Claims. (Cl. 214—132)

This invention relates to material-handling and transferring apparatus, and has particular reference to a kinematic material-loading mechanism of the type adapted for mounting on an automotive base vehicle, and operating to gather, elevate and transfer loose bulk material from ground level to the bodies of transport vehicles, or other relatively elevated positions of deposit.

In the past, many devices of this general character have been developed, and generally comprise a unit adapted for attachment to a tractor or other automotive vehicle, such unit being capable of independent operation in lifting or elevating materials, but depending almost entirely upon its associated vehicle for maneuverability in initially penetrating the material to be loaded, and in the lateral displacement thereof after loading.

Accordingly, it is an object of this invention to provide a kinematic linkage or loading mechanism adapted to be carried by an automotive vehicle, which is capable of movement in three planes independent of its base vehicle, namely: vertical or lifting movement, longitudinal or shovelling movement, and lateral swinging movement.

It is another object of the present invention to provide a loading mechanism of this character whose movement is controlled substantially through the medium of fluid pressure derived from the power source of the associated base vehicle, thereby permitting facile operation by a single person acting as the operator of the base vehicle.

A further object of this invention is to provide a kinematic linkage or loading mechanism of the above character which may be easily installed upon the ordinary tractor in a minimum of time and without structural modification to the latter.

These and additional objects and advantages will become more apparent with subsequent reference to the following detailed description and the accompanying drawings wherein:

Fig. 1 is a side elevational view of a loader mechanism formed in accordance with this invention, and occupying a position of operation upon the forward end of a tractor vehicle;

Fig. 2 is a front elevational view of the mechanism of Fig. 1;

Fig. 3 is a top plan view thereof;

Fig. 4 is a detailed longitudinal vertical sectional view taken through the material-receiver and its associated mechanism;

Fig. 5 is a fragmentary detailed top plan view disclosing the mode of attachment for the rear portion of the anchoring frame;

Fig. 6 is a top plan view of the fluid-actuated device utilized in this invention to impart lateral swinging movement to the loader;

Fig. 7 is a longitudinal vertical sectional view taken along the line 7—7 of Fig. 6;

Fig. 8 is a horizontal sectional view taken along the line 8—8 of Fig. 7;

Fig. 9 is a transverse vertical section view along the line 9—9 of Fig. 7.

With reference to the drawings, the numeral 10 designates an engine-propelled tractor vehicle, the same being of any suitable design, having a frame 11, a power plant 12, and front and rear axles, 13 and 14 respectively. As usual, the tractor is equipped with an engine-driven pump 15, and fluid under pressure discharged from this pump is utilized by the present invention as will be hereinafter described.

In a preferred form, the present invention makes use of an anchoring sub-frame adapted for direct detachable connection with stationary members of the tractor 10. More specifically, the frame comprises a pair of base supports 16 respectively disposed on either side of the tractor and extending substantially longitudinally thereof. The forward ends of the base supports are linked by a transversely disposed base bar 17 positioned forwardly of the tractor 10. The rear ends of the base supports 16 are provided with bifurcated links 18 which receive the reciprocal studs of an attaching bracket 19. The latter is adapted to extend transversely beneath the tractor frame 11 and may be rigidly and permanently attached thereto by any suitable means such as rivets, bolts, or by welding. As shown particularly in Figs. 1 and 3 of the drawings, the base supports are detachably united by means of bolts to the bracket 19, and in this manner, the necessity of detaching the bracket 19, when disconnecting the loader attachment as a unit, is eliminated.

Attached to the forward portion of each of the base supports 16 is a bracket sleeve 20 formed with upper and lower links 21. The lower link of these sleeves is pivotally connected with an axle clamping device 22 which engages the outer portions of the front axle 13 between the frame 11, and front wheels to provide a forward support for the anchoring frame. Joined with the upper links of the sleeves 20 are a pair of transversely spaced upstanding posts 23 which extend upwardly in slightly forwardly inclined manner. Each of these posts terminates in links which are secured to the outer ends of a stationary transversely extending shaft 24. Also embodied in the anchoring frame are a pair of diagonally extending reach links 25 secured at their respective ends to the shaft 24 and the rearward portion of the base supports 16, as at 26. As illustrated in the drawings, the individual frame members are preferably formed from tubular metallic stock, but should in no sense be limited thereto.

Secured to the stationary shaft 24 is a platform base 27 formed with a forwardly projecting lip 28. Welded, or otherwise suitably secured to this lip is a circular cap 29 which rotatably receives the upper end of a substantially vertically disposed shaft 30, the lower end of the shaft also being rotatably supported in a similar end cap 31 rigidly held by the transverse base bar 17.

Rotatably mounted upon the shaft 30 between the end caps 29 and 31, is a vertically disposed tubular mast, post or support member 32 carried by the anchoring sub-frame that forms one upright side member of a four sided kinematic linkage mechanism that is pivoted at its corners or horizontal parallel axes and adapted to handle or support loads adjacent its free end, that is, the end or side thereof opposite said mast 32 and preferably at the lower corner of the kinematic linkage where said remote side is pivotally connected to the bottom ram, motor, arm or member of the linkage, as hereinafter described. The upper end of the mast is provided with a segmental pinion gear 33 which is in engagement with a complemental gear rack 34 carried upon the outer surface of a transversely movable cylinder 35 of a double acting fluid operated or hydraulic motor. Cylinder 35 is slidably mounted upon the stationary piston motor shaft 24, the intermediate portion of which is provided with a circular stationary piston 36 which maintains wiping engagement with the inner wall of the cylinder.

Either end of the cylinder 35 is closed by annularly threaded plugs 37 which are provided with suitable packing glands 38 for the purpose of maintaining fluid-tight wiping engagement with the outer surface of the stationary shaft 24. As shown in Fig. 9, this arrangement provides two separate chambers, 39 and 40 respectively, on either side of the stationary piston 36, and pressure introduced into either of these chambers, independently of the other, will impart a transverse motion to the cylinder in the direction toward the side receiving the pressure. In this manner, a corresponding transverse motion is imparted to the gear rack 34 to provide limited rotation to the pinion gear 33 and its associated tubular mast or post 32.

The introduction of fluid under pressure to the individual chambers of the motor including cylinder 35 is accomplished by means of inlet and outlet ports 41 formed at the rear side of the cylinder and communicating separately with the chambers 39 and 40. Connected with each of the ports 41 are flexible conduits 42 which communicate with the respective ends of a stationary master cylinder 43 of a control valve supported upon the platform base 27. Also communicating with the cylinder 43 intermediate of the outlets, is a fluid supply conduit 44 which is connected with the engine-driven fluid pump 15 of the tractor. Slidably positioned within the cylinder 43 is a longitudinally movable spool-type valve core 45 provided with longitudinally spaced circular pistons 46 whose diameter provides for wiping engagement with the inner wall of the cylinder 43. The pistons 46 are spaced so as to simultaneously register with each of the outlet openings communicating with the flexible conduits 42, and upon sliding movement of core 45 to simultaneously open one of the outlets to the pressure of the fluid supply conduit 44 and open the opposite outlet to be vented through suitable vent openings 47 formed in the cylinder wall opposite the outlets.

It will be understood that when a liquid is employed as a fluid medium in this system, the vent openings 47 should communicate with suitable conduit means leading to a liquid reservoir, not shown, in order that the vented liquid may not be wasted. However, if the system utilizes compressed air or other gaseous fluid medium, the vent openings may well possess the properties of those disclosed in the drawings.

Longitudinal sliding movement of the core 45 within the cylinder is accomplished by means of an extension shaft 48 which extends externally of the cylinder toward its rear end and is linked to a rearwardly extending rod 49 which terminates in an operating lever 50 located substantially adjacent the operator's seat of the tractor.

To summarize the operation of the double acting fluid motor including the sliding cylinder 35, it will be seen that as fluid under pressure from the pump 15 is trapped between the two pistons 46 of the spool valve core 45, the cylinder 35 will remain stationary upon the shaft 24. As the valve core is displaced longitudinally of the valve cylinder 43, fluid under pressure will be introduced to one of the chambers 39 or 40 by way of the flexible conduits 42, at the same time the opposite chamber will be vented to the atmosphere or to a liquid reservoir, thus allowing the unequal pressure exerted upon the stationary piston 36 to force the cylinder sideways in the direction of the greater pressure, thus causing the rack gear 34 to impart rotation about an upright axis to the mast 32.

The outer surface of the vertical mast 32 is provided with a pair of vertically spaced forwardly projecting link brackets, 51 and 52 respectively. The uppermost bracket 51 pivotally receives on a generally horizontal axis the inner end of a forwardly extending tie-rod or arm 53 and maintains the latter for swinging movement in an upright or generally vertical plane. The outer end of the tie-rod or arm 53 is bifurcated, and pivotally carries a transverse pivot bar 54. Pivotally attached to the outer ends of the pivot bar 54 are a pair of transversely spaced depending cradle arms 55, the lower ends of which are pivotally linked about a generally horizontal axis to a pair of rearwardly extending ears 56 formed at the back of a material-receiver 57, which in the present instance embodies a shovel or scoop, but may apply to any type of receiver such as a fork or flat shovel or similar device adapted for the reception of bulk or finely divided materials.

As shown particularly in Fig. 4 of the drawing, the material-receiver 57 is pivotally united with the lower ends of the cradle arms 55 in a manner to provide swinging movement in a downwardly vertical plane to effect a dumping or discharge of materials from the receiver. To prevent dumping movement of the receiver when in an empty condition, a contractile spring 58 is secured at one of its ends to the rear face of the receiver, and at its opposite end to a rearwardly extending post 59 carried by cradle arms 55. This post is provided with a screw adjustment 60 adapted to vary the effective length of the post to increase or decrease the tension upon the spring 58.

It will be noted, however, that in addition to the action of the spring in holding the receiver against pivotal movement, a manually controlled latch device is employed, and comprises a bellcrank lever 61 which is fulcrumed, as at 62, to a substantially upstanding arm 63 projecting from a hollow housing 64. The latter is rigidly attached to a cross bar 65 extending transversely of the cradle arms 55. Slidably carried within this housing and vertically movable therein, is a lock bolt 66 having its lower end projecting below the housing and its upper end pivotally united with the end of the lever 61. A coil spring 67 is positioned within the housing and cooperates with the lock bolt 66 to normally force the same outwardly through the bottom of the housing.

Carried upon the rear of the receiver is a slotted bracket 68 which is provided with an opening which receives the lower end of the lock bolt to rigidly hold the receiver against pivotal movement with respect to the cradle arms 55. The release of the latch device may be conveniently controlled by a flexible cable 69 which extends rearwardly of the receiver to the driver's seat of the tractor. Upon release of the latch device, with the receiver in a loaded condition, the latter will pivot downwardly under the weight of its contents until the same is discharged. The receiver will then be returned, that is, swung about its mounting axis to its normal position under action of the contractile spring 58 and automatically locked by the lock bolt 66.

The lower link bracket 52 of the rotatable mast 32 pivotally receives the inner end of a forwardly projecting longitudinally extensible and contractable hydraulic piston type motor in the form of a fluid-actuated ram or lower arm 70 which is disposed in a substantially vertical plane with respect to the tie-rod 53, that is, tie-rod or arm 53 and lower arm 70 lie in spaced planes that are substantially parallel with respect to each other and arm 70 is substantially directly below or underneath the upper arm 53. This arm, motor or ram 70 generally comprises a base cylinder 71 and a telescoping piston rod 72, the latter being extensible under the influence of fluid pressure introduced within the base cylinder. The forward end of the piston rod 72 of this ram is pivotally united with a generally horizontal cross bar 73 carried between the rearwardly projecting ears 56 of the material-receiver, and in this manner serves to impart a forward longitudinal movement to the receiver upon extension. Fluid under pressure is introduced to the base cylinder of the ram by way of a flexible conduit 74 communicating with the inner end of the cylinder and leading from a suitable control valve 75 disposed in a fluid supply line 76 from the fluid pump 15 of the tractor.

Also incorporated in this lever system, is a second longitudinally extensible and contractable hydraulic piston type motor in the form of a fluid-actuated ram or strut 77 identical in operating features to that of the first ram or arm 70. This second ram or strut is pivotally anchored, as at 78, to the base cylinder 71 of the first ram, and extends diagonally forwardly and upwardly between the lower arm 70 and upper arm 53 with its extensible piston rod engaging the pivot bar 54 carried between the ends of the tie-rod or arm 53. The strut 77 moves the interconnected arms 53 and 70 of the kinematic linkage mechanism about the horizontal parallel axis through which they are pivoted to the post or mast 32 in an upright plane or in vertical directions by increasing the distance between two diagonally opposite parallel corner pivotal axes of the linkage. Upon extension, the strut 77 serves to impart an upward swinging movement to the kinematic linkage by increasing the distance between said pivotal axes and upon downward swinging movement of the kinematic linkage the distance between said corner pivotal axes is decreased. Fluid under pressure is supplied to the second ram or strut 77 by means of a flexible conduit 79 also communicating with the valve 75.

The valve 75 controlling the operation of the two fluid-actuated motors, rams or arms 70 and 77, may be of any suitable type, and as an entity is not involved in the present invention. Preferably, the valve should be of the three-position type whereby fluid under pressure of the pump 15 may be introduced simultaneously to each of the extensible rams, a second position in which fluid from the pump is shut off and fluid is trapped within the rams to maintain the latter in any respective position of extension, and a third position wherein fluid within the rams may be vented in order that the rams may retract under the weight of the system.

The motors, arms or operation of the rams is substantially as follows: With the lever system in a position as shown in full lines in Fig. 1, the valve 75, operated through mechanical linkage 80, is moved to a position allowing passage of fluid from the pump 15 to each of the rams 70 and 77. As pressure is receiver within the cylinders of the rams, the first ram 70 will extend to impart a forward scooping movement to the material-receiver 57; when the piston rod of the first ram 70 is substantially fully extended, fluid pressure will then act upon the piston rod of the second ram 77 to extend the same and impart a lifting or elevating motion to the system and the material-receiver until fully elevated to a position approximately that as shown by broken lines in Fig. 1.

It will be understood that the extension of the first ram takes place prior to the extension of the second ram due to the fact that lesser resistance is offered in the longitudinal scooping movement of the receiver than in the lifting of the entire system. After the rams have become extended, or at any position of extension, the valve 75 may be moved to a position of closure wherein the fluid within the rams is trapped to maintain the lever system in a substantially stationary position. At this time, the system may be swung laterally, by the operation of the rotatable mast, to a desired dumping position with respect to a transferring vehicle or other relatively elevated structures. The latch mechanism may then be released to allow the receiver to dump its contents and return to a locked position under action of its associated return spring. The valve 75 may then be moved to its third position to permit the fluid within the rams to be vented and the rams to be retracted under the weight of the system to return to their normal positions, as shown in Fig. 1.

In view of the foregoing, it will be seen that the present invention provides an extremely useful and highly efficient loading mechanism adapted for attachment to the ordinary tractor, or other automotive base. The present loader attachment further provides means whereby the same may be maneuvered substantially independent of its base vehicle in its function as a loading mechanism. The invention is further characterized by its ease of installation and operation, and its mechanical efficiency.

It will also be seen that I have provided an improved four sided kinematic linkage mechanism that is pivoted together at its corner or parallel axes and carried by a vehicle for powered swinging movement in horizontal planes in reverse directions through one of its generally upright side members and is adapted to handle loads at its free end, that is, the side of the linkage mechanism remote from or opposite the mounted side thereof. It will also be seen that this linkage carries a material receiver preferably in the form of a shovel pivoted at the lower free corner of the linkage which is releasably latched to the member which forms the free side or end thereof. The material receiver may be advanced into material to be loaded either by forward movement of the supporting vehicle or by operation of the lower arm, motor or ram 70 and the kinematic linkage is raised and lowered by the strut 77 changing the distance between diagonal corner pivotal axes of the kinematic linkage.

While I have herein described the fluid system as utilizing either air or liquid as a hydraulic fluid, I prefer that a liquid such as hydraulic oil be used.

While a preferred embodiment of the present invention has been described in detail, it will be manifest that various modifications in details of construction may be resorted to without departing from the spirit of the invention or the scope of the following claims.

I claim:

1. A loader attachment for tractors comprising an anchoring frame adapted for detachable connection with stationary members of a tractor, a substantially vertically disposed mast carried by said frame and occupying a position in front of said tractor, said mast being mounted upon said frame for axial rotational movement, fluid-actuated means for imparting limited axial rotation to said mast, a forwardly extending tie-rod pivotally joined at its inner end to the upper portion of said mast for swinging movement in a vertical plane, a downwardly extending cradle pivotally connected at its upper end to the outer end of said tie-rod, a material-receiver pivotally linked to the lower end of said cradle, a fluid-actuated extensible ram having its inner end pivotally connected to the lower portion of said mast and projecting forwardly thereof in substantially parallel relation to said tie-rod, said ram being pivotally connected at its outer end to the lower end of said cradle, a second fluid-actuated extensible ram disposed diagonally between said tie-rod and said first-named ram and pivotally joined at its respective ends with the inner portion of the first ram and the outer end of said tie-rod, and manually controlled latch-means carried by said cradle and cooperative with said material-receiver for locking the latter against pivotal movement with respect to the cradle, said latch-means serving upon actuation to disengage the two to permit pivotal movement of said receiver, said first-named ram serving upon extension to impart an outward thrust to said material-receiver, said second-named ram serving upon extension to elevate the receiver, and said mast serving upon rotational movement to impart lateral swinging movement to said receiver.

2. A kinematic mechanism for supporting a shovel including a sub-frame adapted to be attached directly to a power operated vehicle, a post carried by said sub-frame for pivotal movement about an upright axis, power operated means for rotating said post in reverse directions upon said axis, an upper arm means carried by said post adjacent its top for swinging movement in an upright plane, an extensible and contractable hydraulic motor forming a lower arm means positioned directly underneath said upper arm means and pivoted at one end to said post, means pivotally interconnecting said arm means adjacent their ends remote from said post whereby said arm means swing together in said upright plane, and an extensible and contractable hydraulic motor forming a strut for moving said interconnected arm means in said upright plane, said strut means extending generally diagonally between said upper and lower arm means, said kinematic mechanism being adapted to carry a shovel adjacent said means interconnecting said upper and lower arms thereof, and said lower arm means and strut operating, respectively, to advance said shovel with respect to material to be loaded and to raise said shovel with respect to the ground.

3. A kinematic mechanism for supporting a shovel including a post adapted to be carried for pivotal movement about an upright axis by a power operated vehicle, power operated means for rotating said post in reverse directions upon said axis, an upper arm means carried by said post adjacent its top for swinging movement in an upright plane, an extensible and contractable hydraulic motor forming a lower arm means positioned directly underneath said upper arm means and pivoted at one end to said post, means pivotally interconnecting said arm means adjacent their ends remote from said post whereby said arm means swing together in said upright plane, and an extensible and contractable hydraulic motor forming a strut for moving said interconnected arm means in said upright plane, said strut means extending generally diagonally between said upper and lower arm means, said kinematic mechanism being adapted to carry a shovel adjacent said means interconnecting said upper and lower arms thereof, and said lower arm means and strut operating, respectively, to advance said shovel with respect to material to be loaded and to raise said shovel with respect to the ground.

4. A kinematic mechanism for supporting a shovel including a support means adapted to be carried for pivotal movement about a substantially vertical axis by a power operated vehicle, power operated means for rotating said support means in reverse directions upon said axis, arm means pivotally carried by said support means for movement in a substantially vertical plane, power operated longitudinally extensible and contractable arm means spaced from said first named arm means pivotally carried by said support means for movement substantially in the same plane as said first named arm means, means interconnecting said arm means adjacent their ends remote from said support means whereby said arms move together, and power operated longitudinally extensible and contractable strut means for moving said interconnected arm means in said substantially vertical plane, said power operated strut means extending diagonally between said spaced arm means, said kinematic mechanism being adapted to carry a shovel adjacent its end remote from said support means, said longitudinally extensible and contractable arm means and said strut means operating respectively to advance said shovel with respect to material to be loaded and to raise said shovel with respect to the ground.

5. In a loader mechanism, the combination of a plurality of members forming a four sided linkage mechanism pivoted adjacent its corners on parallel axes, one side member of said linkage being carried by a vehicle for rotation about a generally upright axis, power means for rotating said side member about said generally upright axis thereby swinging said linkage mechanism in a generally horizontal direction, the lowermost generally horizontal of said linkage members being extensible and contractable, an extensible and contractable strut means extending diagonally between opposite of said members forming said four sided linkage operating to swing said linkage in a generally upright direction by changing the distance between diagonally opposite of said horizontal corner pivot axes, shovel means carried by said linkage mechanism pivoted thereto to swing about the one of said horizontal corner axes adjacent the outer end of said lower extensible and contractable linkage members, latch means carried by the one of said linkage members opposite said rotatable side member thereof for releasably fixing said shovel thereto, and means for swinging said shovel about its mounting axis to be latched by said latch means.

6. In a loader mechanism, the combination of a plurality of members forming a four sided linkage mechanism pivoted adjacent its corners on parallel axes, one side member of said linkage being mounted upon a generally upright axis, the lowermost generally horizontal of said linkage members being extensible and contractable, an extensible and contractable strut means extending diagonally between opposite of said members forming said four sided linkage operating to swing said linkage in a generally upright direction by changing the distance between diagonally opposite of said horizontal corner pivot axes, shovel means carried by said linkage mechanism pivoted thereto to swing about the one of said horizontal corner axes adjacent the outer end of said lower extensible and contractable linkage members, latch means carried by the one of said linkage members opposite said mounted side member thereof for releasably fixing said shovel thereto, and means for swinging said shovel about its mounting axis to be latched by said latch means.

7. In a loader mechanism, the combination of a plurality of members forming a four sided linkage mechanism pivoted adjacent its corners on parallel axes, one side member of said linkage being carried by a vehicle for rotation about a generally upright axis, power means for rotating said side member about said generally upright axis thereby swinging said linkage mechanism in a generally horizontal direction, the lowermost generally horizontal of said linkage members being extensible and contractable, an extensible and contractable strut means extending diagonally between opposite of said members forming said four sided linkage operating to swing said linkage in a generally upright direction by changing the distance between diagonally opposite of said horizontal corner pivot axes, shovel means carried by said linkage mechanism pivoted thereto to swing about the one of said horizontal corner axes adjacent the outer end of said lower extensible and contractable linkage members, and latch means carried by the one of said linkage members opposite said rotatable side member thereof for releasably fixing said shovel thereto.

8. In a loader mechanism, the combination of a plurality of members forming a four sided linkage mechanism pivoted adjacent its corners on parallel axes, one side member of said linkage being mounted by a vehicle for rotation about one axis, power means for rotating said side member about said axis thereby swinging said linkage mechanism in one direction, an extensible and contractable strut means extending diagonally between opposite of said members forming said four sided linkage operating to swing said linkage in a direction substantially at a right angle with respect to said first mentioned direction by changing the distance between diagonally opposite of said parallel corner pivot axes, shovel means pivotally carried by said linkage mechanism lying adjacent the side thereof opposite said mounted side, latch means carried by said linkage mechanism for releasably fixing said shovel with respect to said opposite side thereof, and means for swinging said shovel about its pivotal mounting axis to be latched by said latch means.

RAYMOND W. KEELER.

REFERENCES CITED

The following references are of record in the file of this patent:

UNITED STATES PATENTS

| Number | Name | Date |
|---|---|---|
| 898,618 | Wolfe | Sept. 15, 1908 |
| 1,572,009 | Hansen | Feb. 9, 1926 |
| 1,805,818 | Frisbie | May 19, 1931 |
| 1,985,169 | Howell et al. | Dec. 18, 1934 |
| 2,251,452 | Hirst | Aug. 5, 1941 |
| 2,348,899 | Guignard et al. | May 16, 1944 |
| 2,385,512 | Heath | Sept. 25, 1945 |
| 2,391,224 | Carter | Dec. 18, 1945 |
| 2,413,096 | Barker | Dec. 24, 1946 |
| 2,427,461 | Johnson | Sept. 16, 1947 |
| 2,456,491 | Collins | Dec. 14, 1948 |